Dec. 9, 1924.  
A. MARSILIO  
1,518,267  
MATERIAL GATHERING AND LOADING DEVICE  
Filed May 10, 1924  2 Sheets-Sheet 2
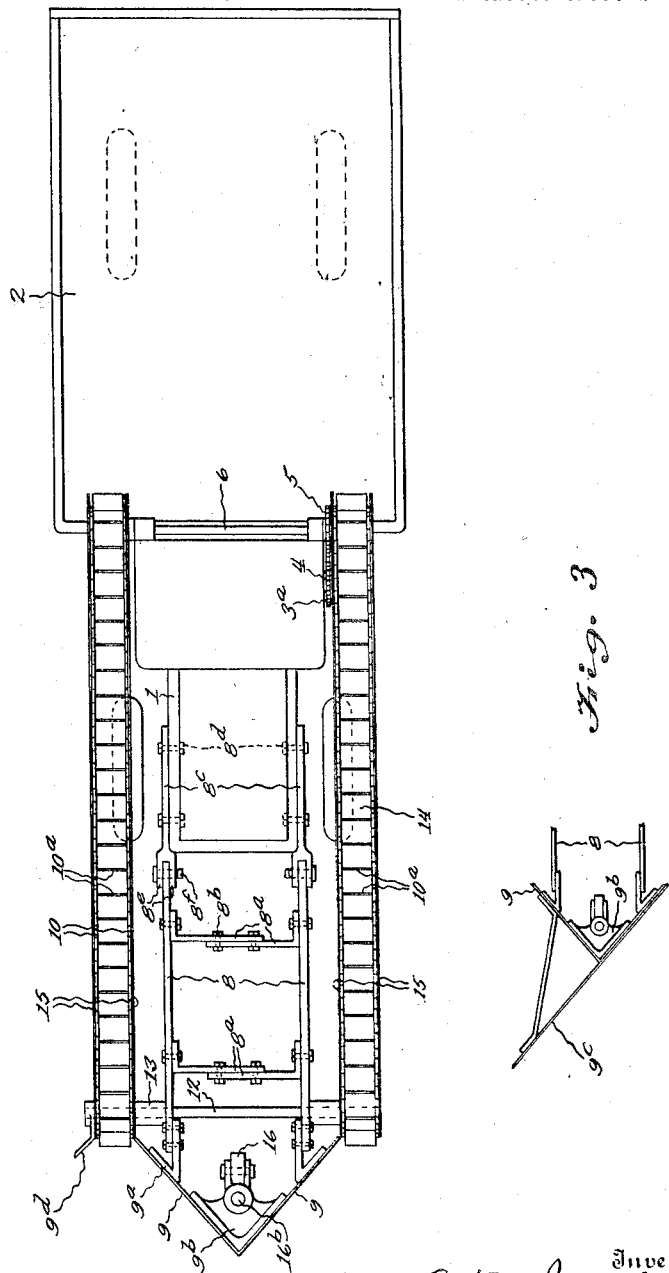

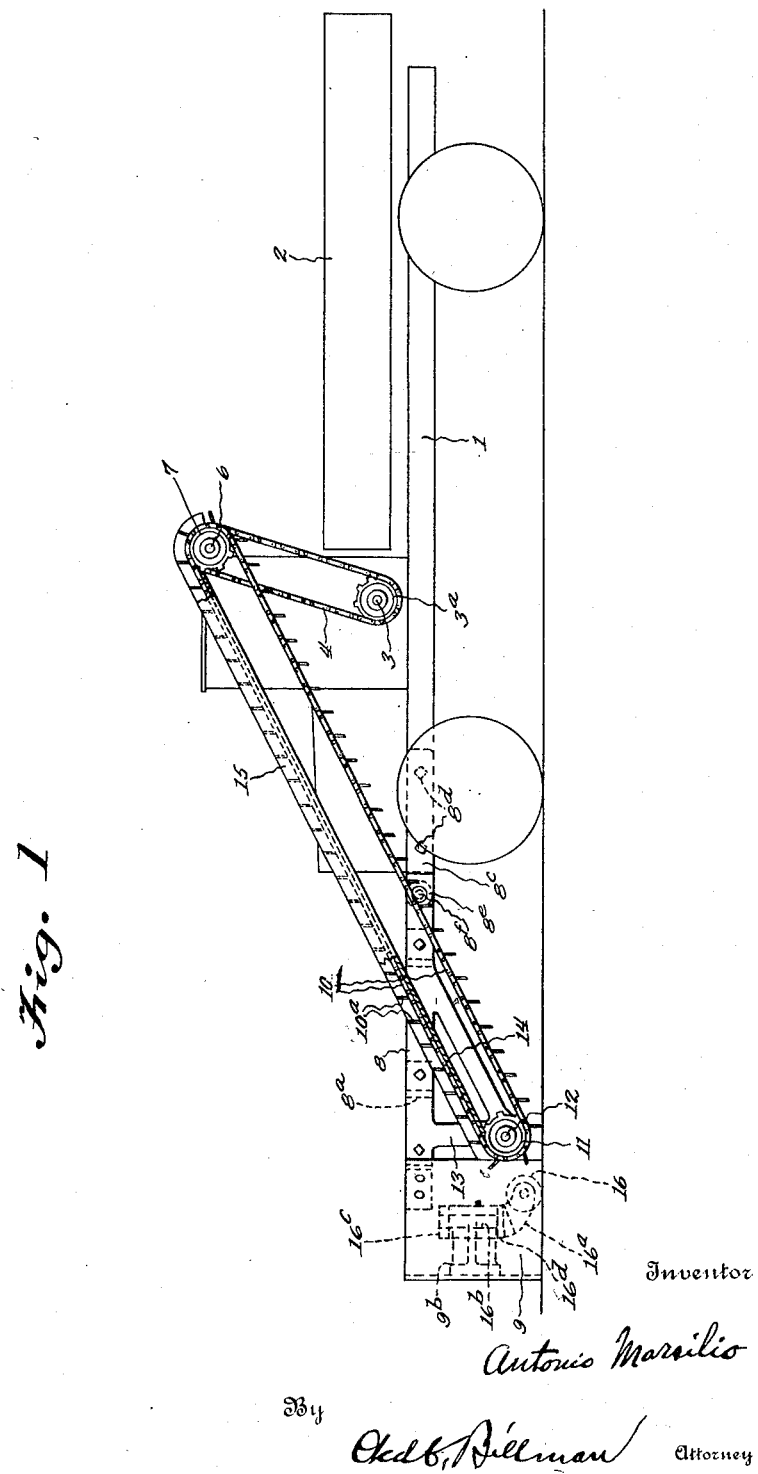

Patented Dec. 9, 1924.

1,518,267

UNITED STATES PATENT OFFICE.

ANTONIO MARSILIO, OF NYACK, NEW YORK.

MATERIAL GATHERING AND LOADING DEVICE.

Application filed May 10, 1924. Serial No. 712,178.

*To all whom it may concern:*

Be it known that I, ANTONIO MARSILIO, a subject of Italy, residing at Nyack, in the county of Rockland and State of New York, have invented certain new and useful Improvements in Material Gathering and Loading Devices, of which the following is a specification.

My invention relates to improvements in material gathering and loading devices, the present embodiment of the invention being particularly designed and adapted for use in connection with self propelled or motor driven vehicles, such as motor trucks, motor cars, automobiles, and the like.

The primary object of the invention is to provide a generally improved material gathering and conveying or loading device of this class which will be exceeding simple in construction, cheap of manufacture, and efficient in use.

A further and very important object is the provision of a relatively movable or implement carrying section, together with suitable conveying mechanism which may be readily and quickly attached to the front of and driven from any ordinary motor truck, or the like, the improved material gathering and accumulating device or implement at the front being adapted to be readily adjusted to meet the varying demands of actual service and being adapted to gather and convey the material to either side of the vehicle, either singly or simultaneously, as desired.

A still further and important object is the provision of a relatively movable implement and conveyer carrying section at the front embodying an improved frame made up of adjustably connected side and cross members and quick detachable hinge members or sections adapted to be readily attached to or detached from the front ends of the vehicle chassis frame members of vehicles having chassis frames of varying widths and construction.

A still further object is the provision of a vertically movable hingedly connected implement and conveyer carrying section at the front adapted to be guided and operated solely by the movements of the motor driven vehicle to be loaded at the rear.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a side elevation of the improved device applied to the front end of an ordinary motor driven truck.

Fig. 2, a top plan view of the same.

Fig. 3, a view of a modified form of scraper implement.

Similar numerals of reference designate like parts throughout all the figures of the drawings.

The motor truck may be of any suitable and convenient form embodying, for example, suitable chassis side bars or members 1, with a material receiving box or receptacle, 2, and suitable motor driven propeller or driving mechanism and a suitably connected shaft 3. The shaft 3 is provided with a sprocket wheel $3^a$, provided with a spocket chain 4, leading to a second sprocket wheel 5, on a second shaft 6, carrying a pair of sprocket wheels 7, projecting, in the present instance, on either side of the vehicle body or chassis frame members and adapted to drive the endless conveyer, hereinafter referred to. If desired, the shaft 3 may be suitably connected to the box or bed 2 for tilting or elevating the latter in a well known and understood manner.

Referring now to the improved material gathering and loading device to which this invention particularly relates, it will be seen that such device comprises a relatively movable or implement carrying section made up, in the present instance, of a relatively movable hingedly connected frame embodying longitudinally extending side bars 8, adjustably connected and movable toward each other through the medium of overlapping cross bars $8^a$, the latter being provided with adjustable slots having adjusting bolts $8^b$. As a means of quickly attaching the implement and conveyer carrying frame to the front ends of the vehicle chassis side bars, hinge member or bars $8^c$, are provided, said hinge bars being connected in some suitable and convenient manner, as for example,— by means of connecting elements or bolts $8^d$. The hinge bars $8^c$ may be provided at their front with spaced hinge lugs $8^e$, having suitable bolt receiving openings for carrying hinge or bearing bolts $8^f$, passing through suitable bearing openings in the rear ends of the implement carrying frame section or side bars 8.

The improved earth-working implement or material gathering and accumulating device carried at the front of the relatively movable section or frame may be of any suitable and convenient type. In the present instance, such implement or device is in the specific form of a scraper having rearwardly diverging blades 9, connected and supported at their rear by means of brackets 9ª, detachably connected to the front ends of the side bars 8 of the implement carrying section or frame. The front pointed or apex portion of the scraper implement is mounted upon a supporting block 9ᵇ, forming a suitable bearing for the supporting device or wheel adapted to carry and support the front end of the implement in proper relative position to the surface or material being operated upon, as hereinafter referred to.

The arrangement of the blades 9 of the scraper implement is such as to accumulate and discharge the material at opposite sides of the vertically movable or implement carrying section to be engaged by the conveyers, hereinafter referred to. Should it be desired, however, to engage material only from one side of the path to be traveled by the implement and to accumulate it wholly to the opposite side thereof and to be conveyed upon the motor driven vehicle to a conveyer at one side only, one of the blades 9 may be provided with an extension 9ᶜ, as indicated in Fig. 3 of the drawings.

As a means of transferring or transporting the material from the material gathering and accumulating device to the vehicle body, such for example, as the box or receptacle 2, a suitable conveying device is provided, said conveyer, in the present instance, being in the specific form of endless sprocket chains 10, passing over and receiving their motion from the sprocket wheel 7 of the shaft 6, hereinbefore referred to.

The endless conveyer members 10 are provided with suitable blades or bucket arms 10ª, and as a means of carrying the lower or material receiving ends of the conveyers in proper relative position to the material accumulating implement and particularly as a means of adjusting the lower or material receiving ends of the conveyers as required, the conveyers 10 pass over sprocket wheels 11, on a transverse shaft 12, the latter being mounted in the lower ends of bearing brackets 13, depending from the front ends of the side bars 8 of the movable section. The upper members or passes of the endless conveyers 10 preferably pass upwardly over elevator guides or channel shaped boxes consisting, in the present instance, of inclined bottom members 14, and side members 15.

As a means of controlling or steering the vertically movable implement carrying section wholly from the motor driven truck so as to permit such implement or section to be turned from one side to the other in accordance with the steering movements imparted to the truck, the front end of the implement carrying frame is supported upon and carried by a transporting device of the swivel or caster type consisting, in the present instance, of a trailing supporting wheel 16, mounted in a frame 16ª, adapted to swing beneath the bearing block 9ᵇ and provided with a bearing stem 16ᵇ, extending through a bearing opening in the block and secured at its top by means of a nut or securing element 16ᶜ.

As a means of vertically adjusting the front end of the implement carrying frame, suitable adjusting mechanism may be provided, as for example,—the wheel 16 and wheel carrying frame 16ª may be adjusted by means of a wear plate 16ᵈ, of a desired thickness or by adjusting the bearing 16ᵇ of the block 9ᵇ in a well known and understood manner. If desired, a supplemental guide or shield blade 9ᵈ, may be placed at the receiving end of the conveyer, as indicated in Fig. 2 of the drawings.

Having thus described one of the embodiments of my invention, without having attempted to set forth all the forms in which it may be made, or all the modes of its use, what I claim and desire to secure by Letters Patent is,—

1. In a material gathering and conveying device for self-propelled vehicles, a movable front section including material gathering conveying and transporting means connected to the front of the vehicle and controlled and steered from the latter, means for relatively adjusting said material gathering and transporting means, and means for operating said material conveying means by the vehicle propelling means.

2. A material gathering and loading device for vehicles, comprising a pivotally connected implement carrying frame provided at its front with a trailing wheel and arranged in front of and guided by the motor vehicle, and endless conveyers carried at the sides of said implement carrying frame driven from the motor vehicle.

3. In a material gathering and conveying device for vehicles, a vertically movable implement section comprising adjustably connected side and cross members including means for hingedly connecting to the front ends of vehicle chassis side frames whereby the same may be adjusted to chassis side frames of varying widths.

4. In a material gathering and conveying device, including a motor vehicle, a frame section including a steering caster wheel attached to the front of said motor vehicle comprising adjustable side members and cross members including hinge connections at the front end of the motor vehicle whereby the same may be adjusted to motor vehicles of varying widths.

5. A material gathering and loading device for vehicles, including self-propelling means comprising a vertically movable frame provided with a caster wheel and an implement guided by the motor vehicle, and conveyers carried by said vertically movable frame in cooperative relation to said implement and driven from the motor vehicle through said self-propelling means.

6. In a material accumulating and loading device, a vehicle including a vehicle body and a relatively movable hinged section at its front, a material gathering and accumulating device carried by said movable section, means for supporting and adjusting said movable section and device, and means for transferring the material from said material gathering and accumulating device to the vehicle body.

7. In a machine of the character described, a self-propelled vehicle, a frame section provided with a trailing wheel and having pivot connections on the front of said motor vehicle permitting vertical and preventing lateral movement relative to said vehicle, an implement carried by said frame section adapted to collect and deliver material at one side thereof, and a conveyer extending between and adapted to convey material from said implement to the motor vehicle and operable by the latter.

8. A material gathering and loading device, comprising a vehicle including relatively fixed and movable frames, means on said movable frame for accumulating material in front of the vehicle and delivering the same to one side thereof, means at the side of said fixed and movable frames for conveying the material from said material accumulating means to the vehicle, and means for flexibly supporting said movable section and material gathering and accumulating device.

9. In a machine of the character described, a self-propelled vehicle, a frame section provided at its front with a caster wheel and flexibly connected at its rear to the front of said motor vehicle for vertical movement relatively thereof, an implement carried by said frame section in front of said caster wheel adapted to collect and deliver material to the sides of said frame section, and conveyers extending between and conveying material from the delivery sides of said implement to the motor vehicle and operable by the movements of the latter.

10. A material gathering and loading device for vehicles, comprising a vehicle including a chassis frame and a material receiving receptacle, means for propelling said vehicle, a vertically movable section pivotally connected to the front of said chassis frame, a material gathering device carried by said movable section and adapted to deliver material to either side of said section, and conveyers at either side of said movable section and vehicle operable by said vehicle propelling means communicating with the delivery portion of the material gathering and conveying device and said material carrying receptacle of said vehicle.

11. A machine of the character described, comprising a self-propelled vehicle including chassis side frames, an implement and implement carrying section pivotally connected for relative vertical movement to the fronts of said chassis side frames and provided at its front with a trailing supporting wheel whereby said implement and frame are steered through the steering movements of the motor vehicle, a driving shaft on said motor vehicle provided with sprocket wheels, means for driving said driving shaft from said motor vehicle, sprocket wheels on said implement carrying frame, and endless sprocket chain conveyers on said sprocket wheels for conveying the material as delivered from the implement to the self-propelled vehicle.

12. A machine of the character described, comprising a motor vehicle including a chassis frame and a material receiving receptacle, an implement carrying section pivotally connected to the front of said chassis frame and provided at its front with a trailing wheel whereby said implement carrying section is steered and controlled through the movements of the motor vehicle, a driving shaft on said motor vehicle provided at either side with sprocket wheels, means for driving said driving shaft from said motor vehicle, sprocket wheels at either side of said implement carrying section, and endless sprocket chain conveyers on said sprocket wheels at the sides of said implement carrying section for conveying the material to the receptacle on said motor vehicle.

In testimony whereof I have affixed my signature.

ANTONIO MARSILIO.